United States Patent
Krause et al.

(10) Patent No.: US 9,041,352 B2
(45) Date of Patent: May 26, 2015

(54) BELT BATTERY CHARGER

(71) Applicant: Innovative Accessory Products, Inc., Folcroft, PA (US)

(72) Inventors: Aaron C. Krause, Voorhees, NJ (US); Aleksandrs Titovs, Folcroft, PA (US)

(73) Assignee: Ion Tech Wear, LLC, Folcroft, PA (US)

( * ) Notice: Subject to any disclaimer, the term of this patent is extended or adjusted under 35 U.S.C. 154(b) by 355 days.

(21) Appl. No.: 13/736,202

(22) Filed: Jan. 8, 2013

(65) Prior Publication Data

US 2014/0191723 A1 Jul. 10, 2014

(51) Int. Cl.
*H02J 7/02* (2006.01)
*H02K 7/14* (2006.01)
*H04B 1/38* (2006.01)
*H01M 2/10* (2006.01)
*H02J 7/00* (2006.01)

(52) U.S. Cl.
CPC ............ *H02J 7/0042* (2013.01); *H02K 7/14* (2013.01); *H04B 1/38* (2013.01); *H01M 2/10* (2013.01)

(58) Field of Classification Search
CPC ............ H02J 7/02; H02J 7/0042; H02K 7/14; H04B 1/38; H01M 2/10
USPC ............. 320/114, 111, 112; 310/50; 455/573; 429/96
See application file for complete search history.

(56) References Cited

U.S. PATENT DOCUMENTS

| | | | |
|---|---|---|---|
| 3,919,615 A | 11/1975 | Niecke | |
| 4,143,661 A * | 3/1979 | LaForge et al. | 607/61 |
| D254,612 S | 4/1980 | Gatton | |
| 4,467,742 A * | 8/1984 | Duboy | 114/315 |
| 5,064,108 A * | 11/1991 | Headley | 224/663 |
| 5,151,678 A * | 9/1992 | Veltri et al. | 340/321 |
| D361,744 S | 8/1995 | Nyiry | |
| 6,575,394 B1 * | 6/2003 | Fujita et al. | 242/390.8 |

(Continued)

FOREIGN PATENT DOCUMENTS

| | | | |
|---|---|---|---|
| GB | 2386267 | 9/2003 | |
| GB | 2386267 A * | 9/2003 | H02J 7/00 |

OTHER PUBLICATIONS

Boothroyd, "A Wearable Tactile Intonation Display for the Deaf", IEEE Transactions on Acoustics, Speech, and Signal Processing, vol. ASSP-33, No. 1, Feb. 1985, pp. 111-117.*

(Continued)

*Primary Examiner* — Phallaka Kik
(74) *Attorney, Agent, or Firm* — Norman E. Lehrer

(57) ABSTRACT

A belt battery charger includes a belt having a first end, a second end and an elongated central portion extending between the first and second ends. A plurality of electrically connected rechargeable batteries are carried by the central portion of the belt. A belt buckle located at the first end of the belt includes a frame that is secured to the central portion of the belt. The buckle further includes a prong in the form of an electrical connector electrically connected to the batteries and pivotally secured to the frame. The second end of the belt includes a number of spaced apart eyelets passing therethrough. The prong is shaped so as to be able to enter one of the eyelets to secure the second end of the belt to the buckle in the conventional manner. A second electrical connector is located adjacent the second end of the belt and is also connected to the batteries. One of said connectors is adapted to be connected to a cell phone for charging the same.

4 Claims, 3 Drawing Sheets

(56) References Cited

U.S. PATENT DOCUMENTS

| | | | |
|---|---|---|---|
| 7,076,206 B2 | 7/2006 | Elferich et al. | |
| 7,619,388 B1 | 11/2009 | Nana | |
| 7,863,859 B2 | 1/2011 | Soar | |
| 8,062,797 B2 | 11/2011 | Fisher et al. | |
| 2002/0190691 A1 | 12/2002 | Chen | |
| 2007/0105629 A1* | 5/2007 | Toyama | 463/42 |
| 2008/0119421 A1* | 5/2008 | Tuszynski et al. | 514/34 |
| 2009/0051312 A1 | 2/2009 | Simon et al. | |
| 2014/0052342 A1* | 2/2014 | Seibert | 701/45 |
| 2014/0098523 A1* | 4/2014 | Sutton | 362/103 |
| 2014/0120983 A1* | 5/2014 | Lam | 455/557 |

OTHER PUBLICATIONS

Dittmar et al., "Wearable Medical Devices Using Textile and Flexible Technologies for Ambulatory Monitoring", Proceedings of the 2005 IEEE Engineering in Medicine and Biology, 27th Annual Conference, Sep. 1-4, 2005, pp. 7161-7164.*

Zhou, Chinese Patent Document No. CN 201869950 U, Published Jun. 2011, 3 pages.*

Wang, Chinese Patent Document No. CN 202554218 U, Published Nov. 2012, 3 pages.*

German Patent Document No. DE 202009012130 U1, Published Jul. 2010, 3 pages.*

Du Kim G, Korean Patent Document No. KR 1168586 B1, Published Jul. 2012, 3 pages.*

* cited by examiner

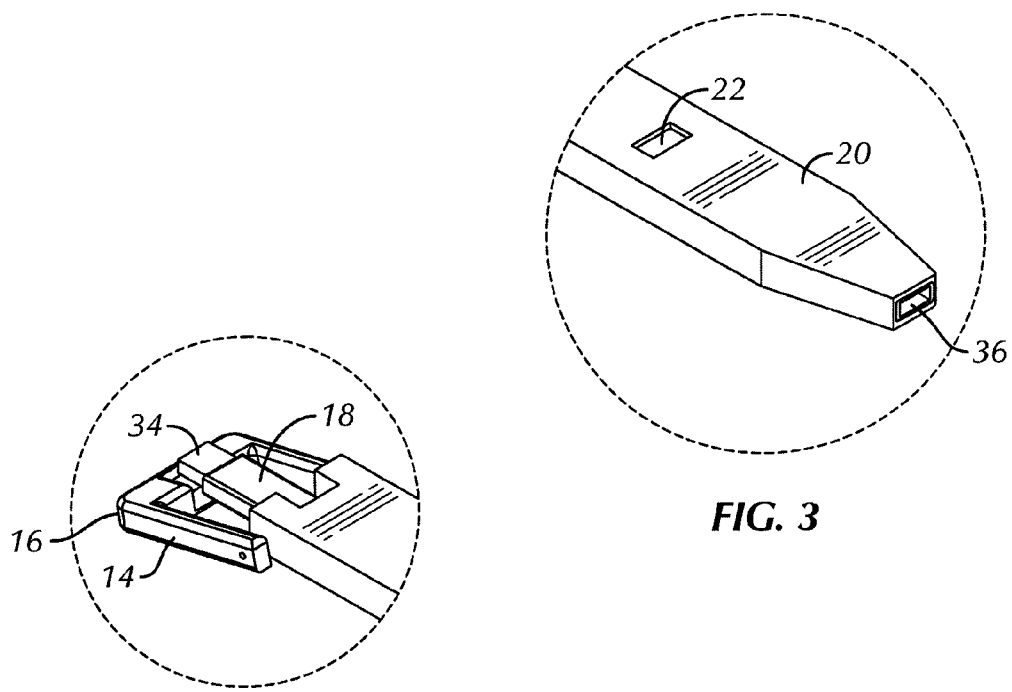
FIG. 3
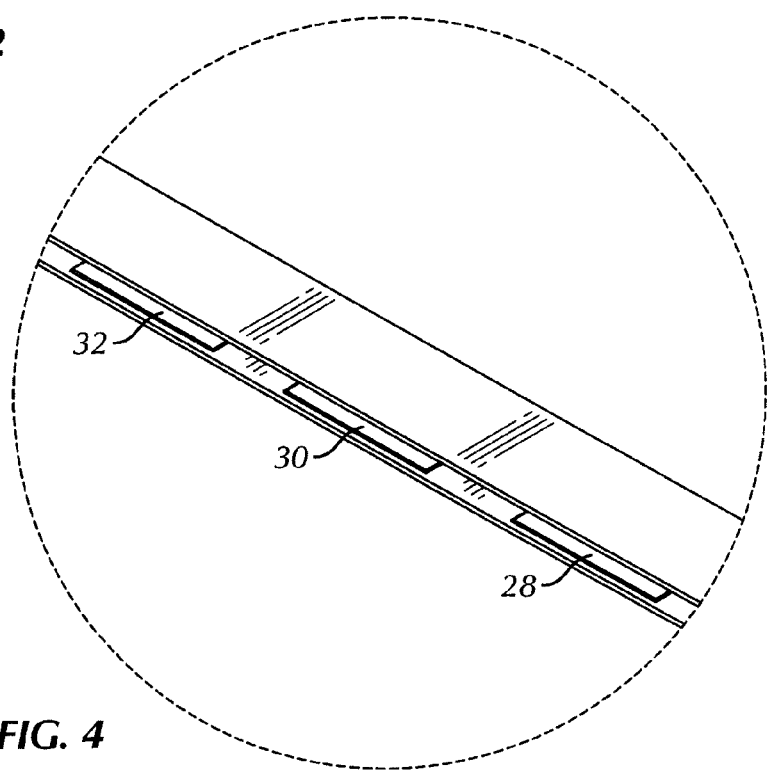
FIG. 2
FIG. 4

BELT BATTERY CHARGER

BACKGROUND OF THE INVENTION

The present invention is directed toward a battery charger for cellular telephones and other portable electronic devices and more particularly, toward such a battery charger that is in the form of and resembles a conventional belt that is worn as an article of apparel.

Cellular telephones are no longer designed or used simply to make short or emergency phone calls. Today, many people use cell phones as their primary means of communication, as personal organizers, and as storage devices for electronic information. Many cell phones, commonly referred to as "smartphones" are capable of playing music and movies, taking pictures and movies, surfing the Internet, and sending and receiving email and text messages. The evolution from a simple emergency phone to a multiuse smartphone requires a correspondingly increased amount of power.

The average cell phone provides, on average, 2-12 hours of operating time before the cell phone battery needs to be recharged. Of course, the amount of time depends on the types of tasks the phone is required to perform. Tasks, such as surfing the Internet, sending email, or watching a movie, require substantially more power than simple telephone communications.

The cell phone is powered by a rechargeable battery, which is recharged with a cell phone charger that must be plugged into a 110 volt outlet or a 12 volt socket in an automobile. Although cell phones have evolved into more sophisticated devices, batteries have not. The result is that cell phone batteries frequently run out of power and require frequent recharging. A battery that is depleted or is in danger of depletion can create a problem for someone waiting for a call or email message or needing to make or finish an important call.

Recharging a cell phone using a standard battery charger (such as shown in FIG. 5) requires that the charger be plugged into an external power source and that the charger be plugged into the cell phone. The charging process requires that the user be at a place where there is an external power source. This can frequently pose a problem, depending on the location of the user. This can be particularly difficult if the person is traveling. In addition, the user generally needs to carry two separate chargers, one for the standard household outlet and one for the automobile charger. Furthermore, once a power source for charging the battery has been found, the user, if he or she desires to use the cell phone while it is charging, is then confined to the immediate surroundings of the power source. And while a power source may be available, the user may not have the time to wait while the phone is charging.

To alleviate some of the above problems, it has been known to carry extra charged batteries for a cell phone. This can be expensive and does not necessarily adequately solve the problem because all of the batteries will eventually be depleted and ultimately must be recharged.

It has also been proposed to include one or more larger external batteries in a carrying case that can be used to charge the cell phone battery when needed. See, for example, U.S. Pat. No. 7,619,388 to Nana. Even further, it is has been proposed to incorporate batteries into various articles of clothing to be worn by the person for powering electronic devices. See, for example, U.S. Pat. No. 3,919,615 to Niecke. The belt worn batteries of Niecke could also conceivably be used to recharge the battery of a cell phone. None of these prior art systems is satisfactory as they are awkward to carry and can be unsightly.

There is, therefore, a need for a cell phone battery charger that can easily and inconspicuously be carried by a cell phone user and which can recharge the person's cell phone anywhere the person may be and at any time.

SUMMARY OF THE INVENTION

The present invention is designed to overcome the deficiencies of the prior art discussed above. It is an object of the present invention to provide a cell phone battery charger that can be used to recharge a cell phone at substantially any time and in any place.

It is another object of the present invention to provide a cell phone battery charger that can easily and inconspicuously be carried by a cell phone user.

In accordance with the illustrative embodiments demonstrating features and advantages of the present invention, there is provided a cell phone battery charger in the form of a belt having a first end, a second end and an elongated central portion extending between the first and second ends. A plurality of electrically connected rechargeable batteries are carried by the central portion of the belt in one location or spaced along a length thereof. A belt buckle located at the first end of the belt includes a frame that is secured to the central portion of the belt. The buckle further includes a prong in the form of an electrical connector electrically connected to the batteries and pivotally secured to the frame. The second end of the belt includes a number of spaced apart eyelets passing therethrough. The prong is shaped so as to be able to enter one of the eyelets to secure the second end of the belt to the buckle in the conventional manner. A second electrical connector is located adjacent the second end of the belt and is also connected to the batteries. One of said connectors is adapted to be connected, by way of a recharging cable, to a cell phone for charging the same.

The battery charger according to the invention enables the user to continue using a cell phone with a depleted cell phone battery for many additional hours or days of operating time, without having to connect the cell phone to an external power source. The amount of time provided by the charging belt depends, of course, on the particular type and model of cell phone or device and the types of tasks performed with the device.

Other objects, features, and advantages of the invention will be readily apparent from the following detailed description of the preferred embodiments thereof taken in conjunction with the drawings.

BRIEF DESCRIPTION OF THE DRAWINGS

For the purpose of illustrating the invention, there is shown in the accompanying drawings forms which are presently preferred; it being understood that the invention is not intended to be limited to the precise arrangements and instrumentalities shown.

FIG. 2 is an enlarged perspective view of the belt buckle portion of the belt battery charger;

FIG. 3 is an enlarged perspective view of the end portion of the belt battery charger;

FIG. 4 is an enlarged perspective view of the central battery portion of the belt battery charger;

DETAILED DESCRIPTION OF THE PREFERRED EMBODIMENTS

Figure 1:
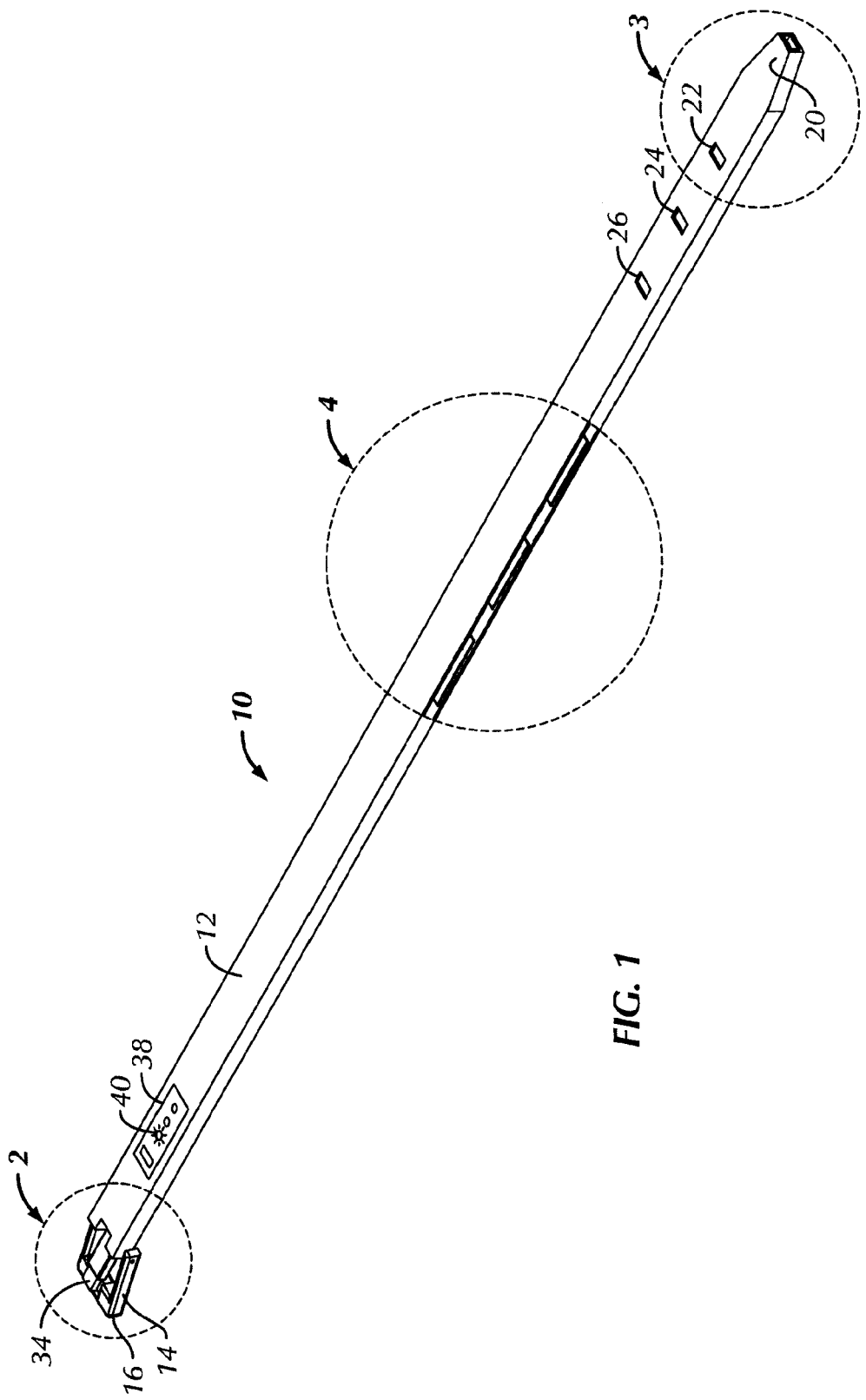
FIG. 1 is top perspective view of the belt battery charger of my invention.

Referring now to the drawings in detail wherein like reference numerals have been used throughout the various figures to designate like elements, there is shown in FIGS. 1-4 a belt battery charger constructed in accordance with the principles of the present invention and designated generally as 10.

The belt battery charger 10 is constructed to resemble a standard belt normally worn by a man or a woman on a pair of trousers or other similar article of wearing apparel. The belt is intended to be worn in the same manner and for the same purpose as any other belt. In normal use, it is intended that the belt 10 will be inconspicuous and will appear to simply be a belt.

The belt battery charger 10 resembles an ordinary belt in that it includes an elongated central portion 12 that may be made of leather, cloth or substantially any other material known for making belts. At one end of the belt 10 is a belt buckle 14 that resembles an ordinary belt buckle well known in the art. It includes a substantially U-shaped frame 16 that is secured to the end of the central belt portion 12 and a prong 18 that is pivotally secured to the frame 16. Again, the belt buckle 14 including the frame 16 and the prong 18 substantially resemble a standard belt buckle and are assembled and function in substantially the same manner as a standard belt buckle.

The other end 20 of the central portion 12 of the belt 10 is preferably tapered as shown in the drawings. Adjacent the second end 20 of the belt 10 are a plurality of spaced apart apertures or eyelets such as shown at 22, 24 and 26. The eyelets are of a size and shape so as to allow the prong 18 to pass therethrough. In this way, the belt 10 can be worn and adjusted in the known manner.

The central section 12 of the belt 10 is preferably made of double thickness of material having a front surface and a rear surface. Located between these two surfaces are a plurality of rechargeable batteries such as shown at 28, 30 and 32. These batteries can either be spaced along the length of the belt or can be grouped together in one location. The number of batteries and the size thereof can vary depending on the amount of storage desired.

The prong 18 is in the form of a standard male universal serial bus (USB) connector 34. Located within the belt 12 at the other end 20 thereof is a female USB connector 36. Preferably, the connector 36 is integrally formed within the belt so that only the end is exposed, as shown in the drawings.

The USB male connector 34 and the female connector 36 are connected to the battery or batteries 28-32 through wiring within the interior of the belt 10. These connections and the manner in which they are wired are well known in the art. An electronic circuit 38 can be included which controls the charging and discharging of the batteries and may include one or more lights such as shown at 40 that can indicate the degree that the batteries have charged or discharged.

Figure 5:
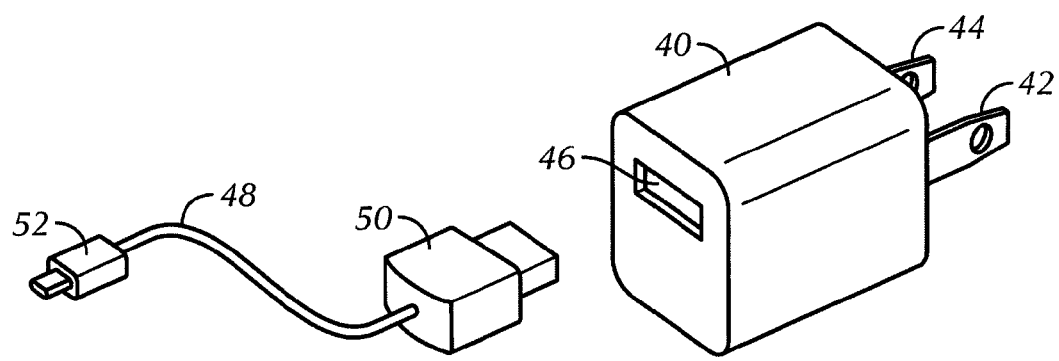
FIG. 5 is a perspective view of a standard cell phone battery charger.
Figure 6:
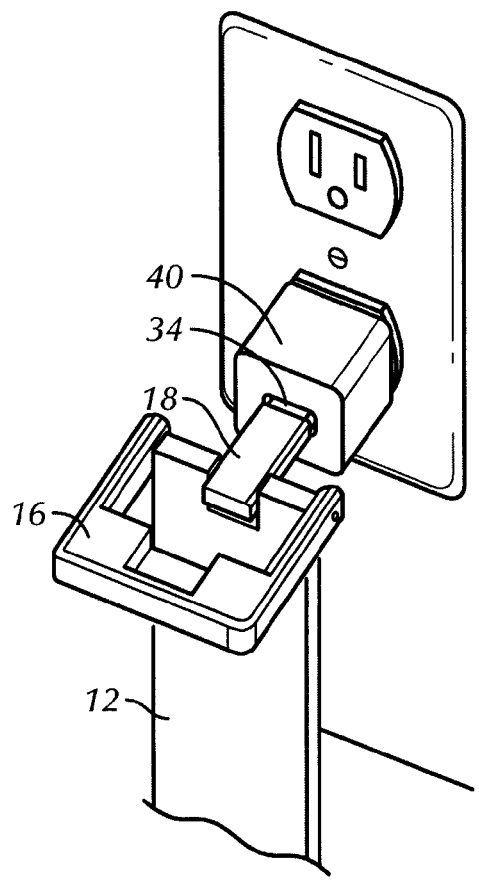
FIG. 6 is a perspective of the buckle end of the belt battery charger plugged into a wall charger in order to charge the belt batteries.

The belt battery charger 10 is utilized in the following manner. Initially, substantially every cell phone, smartphone or similar electronic device comes with a charger system such as shown in FIG. 5 that includes a transformer 40 that may include prongs 42 and 44 that fit into a standard electrical outlet. Other transformers provided with such chargers may include a plug to be inserted into a 12 volt automobile socket. The transformer 40 also includes a female USB socket 46. A cord 48 that includes a male USB plug 50 at one end and a plug 52 at the other end that is adapted to plug into the cellular phone, smartphone or other electronic device is located at the other end of the cord.

The batteries within the belt battery charger 10 can be charged by plugging the male USB plug 34 (the prong 18 of the belt buckle 14) into the transformer 40 that is plugged into a standard electrical outlet. After the belt batteries within the belt have been fully charged, the belt can then be worn in the ordinary manner. When it is desired to charge a cell phone or similar device, the male USB plug 50 of the cord 48 is plugged into the female USB connector 36 at the end 20 of the belt 10. The connector 52 at the other end of the cord 48 is then plugged into the cell phone or similar device for either powering the cell phone or recharging the cell phone battery.

While the prong 18 is shown to be in the form of a standard male USB connector, this is obviously by way of example only. Other types of connectors could also be utilized. Even further, it is not beyond the scope of the present invention to include a transformer within the interior of the belt in addition to or as part of the electronic circuit 38. In this case, the prong 18 could be in the form of a standard two-prong electrical plug that could be plugged directly into a standard 110 volt electrical outlet. If two prongs are used in this manner rather than the single prong, the apertures or eyelets 22, 24 or 26 would be redesigned appropriately in order to accommodate the double prongs.

The present invention may be embodied in other specific forms without departing from the spirit or essential attributes thereof and accordingly, reference should be made to the appended claims rather than to the foregoing specification as indicating the scope of the invention.

We claim:

1. A belt battery charger comprising:
 a belt including a first end and a second end and an elongated central portion extending between said first and second ends;
 a plurality of electrically connected rechargeable batteries carried by said central portion of said belt;
 a belt buckle at said first end of said belt, said buckle including a frame secured to said central portion, said buckle further including a prong pivotally secured to said frame, said prong being in the form of an electrical connector electrically connected to said plurality of batteries, and
 a plurality of spaced apart eyelets passing through said belt adjacent said second end thereof, said prong being shaped so as to be able to enter one of said eyelets to secure said second end of said belt to said buckle.

2. The belt battery charger as claimed in claim 1 further including a second electrical connector adjacent said second end of said belt, said second connector being connected to said batteries.

3. The belt battery charger as claimed in claim 2 wherein one of said electrical connectors is adapted to be connected to a cell phone for charging the cell phone.

4. The belt battery charger as claimed in claim 2 wherein one of said electrical connectors is adapted to be connected to an electrical outlet for charging said batteries.

* * * * *